US012172181B2

(12) United States Patent
Dawson et al.

(10) Patent No.: US 12,172,181 B2
(45) Date of Patent: Dec. 24, 2024

(54) AIRLESS HANDHELD SPRAYER REPAIR

(71) Applicant: Graco Minnesota Inc., Minneapolis, MN (US)

(72) Inventors: Charles W. Dawson, Otsego, MN (US); Diane L. Olson, Elk River, MN (US); Pamela J. Muetzel, Maple Lake, MN (US); Robert W. Kinne, Andover, MN (US)

(73) Assignee: Graco Minnesota Inc., Minneapolis, MN (US)

(*) Notice: Subject to any disclaimer, the term of this patent is extended or adjusted under 35 U.S.C. 154(b) by 541 days.

(21) Appl. No.: 17/322,641

(22) Filed: May 17, 2021

(65) Prior Publication Data

US 2021/0291208 A1 Sep. 23, 2021

Related U.S. Application Data

(62) Division of application No. 15/872,759, filed on Jan. 16, 2018, now Pat. No. 11,007,545.

(Continued)

(51) Int. Cl.

| | |
|---|---|
| ***F04B 17/03*** | (2006.01) |
| ***B05B 9/01*** | (2006.01) |
| ***B05B 9/04*** | (2006.01) |
| ***B05B 9/08*** | (2006.01) |
| ***B05B 15/14*** | (2018.01) |

(Continued)

(52) U.S. Cl.

CPC .............. *B05B 9/0413* (2013.01); *B05B 9/01* (2013.01); *B05B 9/0861* (2013.01); *B05B 15/14* (2018.02); *F04B 9/02* (2013.01); *F04B 17/03* (2013.01); *F04B 23/025* (2013.01)

(58) Field of Classification Search

CPC ....... B05B 9/0413; B05B 9/01; B05B 9/0861; B05B 15/14; F04B 9/02; F04B 17/03; F04B 23/025; F04B 1/145; F04B 1/182

See application file for complete search history.

(56) References Cited

U.S. PATENT DOCUMENTS

| | | | |
|---|---|---|---|
| 1,650,377 | A | 11/1927 | Nixon |
| 1,911,603 | A | 5/1933 | Breuer |

(Continued)

FOREIGN PATENT DOCUMENTS

| | | | |
|---|---|---|---|
| CN | 200998701 | Y | 1/2008 |
| CN | 101273198 | A | 9/2008 |

(Continued)

*Primary Examiner* — Thomas Fink

(57) ABSTRACT

Various embodiments concern a handheld paint sprayer for spraying a paint. The sprayer can comprise a shell body comprising a door that, when opened, exposes an opening into an interior of the shell body, the door configured to close over the opening. The sprayer can further comprise a trigger connected to a handle, a motor in the interior, and a paint reservoir connected to the shell body. The sprayer can further comprise a nozzle in fluid communication with the reservoir and a pump located in the interior of the shell body. The pump is operated by the motor, the pump configured to pump the paint from the reservoir out of the nozzle as a spray. The pump is removable from the interior of the shell body through the opening when the door is opened but is not removable through the opening when the door is closed.

12 Claims, 11 Drawing Sheets

Related U.S. Application Data

(60) Provisional application No. 62/446,489, filed on Jan. 15, 2017.

(51) Int. Cl.
*F04B 9/02* (2006.01)
*F04B 23/02* (2006.01)

(56) References Cited

U.S. PATENT DOCUMENTS 2,195,929 A 4/1940 Klett
2,405,006 A 7/1946 Ashton
2,407,792 A 9/1946 McMillan
2,488,789 A 11/1949 Williams
2,491,230 A 12/1949 Theis
2,540,357 A * 2/1951 Stanley ................. B05B 9/0861 417/415
2,629,539 A 2/1953 Drewes, Jr.
2,736,606 A 2/1956 Kmiotek
2,752,854 A 7/1956 Prior et al.
2,999,646 A 9/1961 Wagner
3,207,080 A 9/1965 Schlosser
3,250,225 A 5/1966 Taplin
3,276,389 A 10/1966 Bower, Jr.
3,317,141 A 5/1967 Mann
3,403,818 A 10/1968 Enssle
3,416,461 A 12/1968 McFarland
3,462,082 A 8/1969 Everett
3,633,828 A 1/1972 Larson
3,658,257 A 4/1972 Rood
3,680,981 A 8/1972 Wagner
3,741,689 A 6/1973 Rupp
3,769,879 A 11/1973 Lofquist, Jr.
3,775,030 A 11/1973 Wanner
3,893,627 A 7/1975 Siczek et al.
3,916,449 A 11/1975 Davis
3,955,763 A 5/1976 Pyle et al.
3,993,250 A 11/1976 Shure
3,999,896 A 12/1976 Sebastiani
4,008,984 A 2/1977 Scholle
4,033,511 A 7/1977 Chamberlin
4,068,982 A 1/1978 Quarve
4,160,525 A 7/1979 Wagner
4,162,037 A 7/1979 Koyama
4,165,836 A 8/1979 Eull
4,235,377 A 11/1980 Davis et al.
4,264,021 A 4/1981 Davis, Jr.
4,294,408 A 10/1981 Snyder et al.
4,294,411 A 10/1981 Hastings et al.
4,301,971 A 11/1981 Cornelius et al.
4,365,745 A 12/1982 Beck
4,386,739 A 6/1983 Kwok
4,392,614 A 7/1983 Groth et al.
4,403,924 A 9/1983 Gebauer et al.
4,442,977 A 4/1984 Beiswenger et al.
4,484,707 A 11/1984 Calder
4,549,467 A 10/1985 Wilden et al.
RE32,372 E * 3/1987 Rohner ................ B65H 69/061 57/22
4,700,876 A 10/1987 Wingert
4,756,481 A 7/1988 Leuenberger
4,778,356 A 10/1988 Hicks
4,800,801 A 1/1989 van Zweeden
4,883,412 A 11/1989 Malizard et al.
4,902,206 A 2/1990 Nakazawa et al.
4,971,249 A 11/1990 Tam et al.
4,993,642 A 2/1991 Hufgard
5,051,067 A 9/1991 Terauchi
5,054,947 A 10/1991 Frank et al.
5,066,199 A 11/1991 Reese et al.
5,100,058 A 3/1992 Wei
5,106,274 A 4/1992 Holtzapple
5,137,431 A 8/1992 Kiyoshi et al.
5,145,339 A 9/1992 Lehrke et al.
5,165,869 A 11/1992 Reynolds
5,174,731 A 12/1992 Korver
5,211,611 A 5/1993 Lammers et al.
5,213,485 A 5/1993 Wilden
5,219,274 A 6/1993 Pawlowski et al.
5,249,932 A 10/1993 Van Bork
5,271,537 A 12/1993 Johnson
RE34,608 E 5/1994 Hufgard
5,320,283 A 6/1994 Hollstein et al.
5,332,156 A 7/1994 Wheeler
5,340,029 A 8/1994 Adams
5,362,212 A 11/1994 Bowen et al.
5,378,122 A 1/1995 Duncan
5,391,058 A 2/1995 Goto et al.
5,443,211 A 8/1995 Young et al.
5,527,160 A 6/1996 Kozumplik, Jr. et al.
5,567,118 A 10/1996 Grgurich et al.
5,616,005 A 4/1997 Whitehead
5,649,809 A 7/1997 Stapelfeldt
5,699,967 A 12/1997 Conatser et al.
5,769,321 A 6/1998 Cyphers
5,816,778 A 10/1998 Elsey, Jr. et al.
5,927,954 A 7/1999 Kennedy et al.
6,106,246 A 8/2000 Steck et al.
6,142,749 A 11/2000 Jack et al.
6,158,982 A 12/2000 Kennedy et al.
6,168,093 B1 1/2001 Greer, Jr. et al.
6,176,412 B1 1/2001 Weinger et al.
6,264,115 B1 7/2001 Liska et al.
6,280,149 B1 8/2001 Able et al.
6,299,415 B1 10/2001 Bahrton
6,318,647 B1 11/2001 Gaw et al.
6,390,386 B2 5/2002 Krohn et al.
6,402,486 B1 6/2002 Steck et al.
6,488,180 B1 12/2002 Bayat
6,599,107 B2 7/2003 Cooper et al.
6,644,564 B2 11/2003 Perkitny
6,702,198 B2 3/2004 Tam et al.
6,708,900 B1 3/2004 Zhu et al.
D490,500 S 5/2004 Ye et al.
6,752,067 B1 6/2004 Davidson et al.
6,752,330 B2 6/2004 DiMaggio et al.
6,811,099 B2 11/2004 Krestine et al.
6,817,544 B2 11/2004 Hanson
6,933,634 B2 8/2005 Frank et al.
7,018,181 B2 3/2006 Cooper et al.
7,025,087 B2 4/2006 Weinberger et al.
7,097,119 B2 8/2006 Hornsby et al.
7,182,280 B2 2/2007 Ye et al.
7,207,500 B2 4/2007 Hudson et al.
7,219,848 B2 5/2007 Sweeton
7,244,464 B2 7/2007 Robens et al.
7,255,294 B2 8/2007 Sweeton et al.
7,350,723 B2 4/2008 Reedu
7,354,255 B1 4/2008 Lihanski et al.
7,399,168 B1 7/2008 Eberwein
7,517,199 B2 4/2009 Reed et al.
7,600,985 B2 10/2009 Meloche et al.
7,624,898 B2 12/2009 Hornsby et al.
7,654,801 B2 2/2010 Spude
7,658,598 B2 2/2010 Reed et al.
7,758,321 B2 7/2010 Fukano et al.
7,789,327 B2 9/2010 Micheli et al.
RE42,706 E * 9/2011 Davidson .................. F04B 9/02 417/415
8,123,500 B2 2/2012 Juterbock et al.
8,167,586 B2 5/2012 Towne
8,182,247 B2 5/2012 Gallwey et al.
8,292,600 B2 10/2012 Reed et al.
8,313,313 B2 11/2012 Juterbock et al.
8,382,445 B2 2/2013 Roseberry
8,393,881 B2 3/2013 Usui et al.
8,485,792 B2 7/2013 McCourt et al.
8,585,372 B2 11/2013 Bacher et al.
2001/0035515 A1 11/2001 Kennedy et al.
2001/0038041 A1 11/2001 Leer et al.
2001/0048882 A1 12/2001 Layman
2002/0028103 A1 3/2002 Frank et al.
2003/0173420 A1 9/2003 Hanson
2004/0057853 A1 3/2004 Ross et al.

(56) References Cited

U.S. PATENT DOCUMENTS

| | | | |
|---|---|---|---|
| 2004/0069791 | A1 | 4/2004 | Neal |
| 2004/0155118 | A1 | 8/2004 | Rice |
| 2004/0217205 | A1 | 11/2004 | Kohs et al. |
| 2004/0226969 | A1 | 11/2004 | Shew |
| 2004/0251321 | A1 | 12/2004 | Ye et al. |
| 2004/0256490 | A1 | 12/2004 | Sweeton |
| 2005/0016448 | A1 | 1/2005 | Dilou |
| 2005/0189445 | A1 | 9/2005 | Hartle et al. |
| 2006/0040044 | A1 | 2/2006 | Robens et al. |
| 2006/0076434 | A1 | 4/2006 | Hornsby et al. |
| 2006/0086824 | A1 | 4/2006 | Pearce, III et al. |
| 2006/0108981 | A1 | 5/2006 | Watson et al. |
| 2006/0153707 | A1 | 7/2006 | Sweeton et al. |
| 2006/0208005 | A1 | 9/2006 | Sweeton |
| 2006/0257271 | A1 | 11/2006 | Juterbock et al. |
| 2007/0025863 | A1 | 2/2007 | Liedtke et al. |
| 2007/0092385 | A1 | 4/2007 | Petrie Pe |
| 2007/0125878 | A1 | 6/2007 | Hahn et al. |
| 2007/0129469 | A1 | 6/2007 | Befurt et al. |
| 2007/0131109 | A1 | 6/2007 | Bruggeman et al. |
| 2007/0134050 | A1 | 6/2007 | Bruggeman et al. |
| 2007/0137938 | A1 | 6/2007 | Carpenter et al. |
| 2007/0170285 | A1 | 7/2007 | Schouten |
| 2007/0212241 | A1 | 9/2007 | Lishanski et al. |
| 2007/0224358 | A1 | 9/2007 | Insausti-Eciolaza et al. |
| 2007/0228186 | A1 | 10/2007 | Hornsby et al. |
| 2007/0252019 | A1 | 11/2007 | Peterson et al. |
| 2007/0261913 | A1 | 11/2007 | Rossner et al. |
| 2007/0272707 | A1 | 11/2007 | Peralta et al. |
| 2007/0278326 | A1 | 12/2007 | Wu |
| 2007/0278787 | A1 | 12/2007 | Jones et al. |
| 2008/0065001 | A1 | 3/2008 | DiNucci et al. |
| 2008/0104780 | A1 | 5/2008 | Dayton et al. |
| 2008/0173705 | A1 | 7/2008 | Girard et al. |
| 2009/0068036 | A1 | 3/2009 | Hsu et al. |
| 2009/0145980 | A1 | 6/2009 | Jones |
| 2009/0152382 | A1 | 6/2009 | Charpie |
| 2009/0279831 | A1 | 11/2009 | Luo et al. |
| 2010/0045096 | A1 | 2/2010 | Schonlau et al. |
| 2010/0072300 | A1 | 3/2010 | Miller et al. |
| 2010/0196176 | A1 | 8/2010 | Kaufmann et al. |
| 2011/0198413 | A1 | 8/2011 | Thompson et al. |
| 2012/0037726 | A1* | 2/2012 | Johnson ................ B05B 9/0888 239/333 |
| 2012/0063925 | A1 | 3/2012 | Parker |
| 2012/0227389 | A1 | 9/2012 | Hinderks |
| 2012/0298771 | A1 | 11/2012 | Johnson et al. |
| 2013/0101445 | A1 | 4/2013 | Schutze |
| 2013/0243630 | A1 | 9/2013 | Simmons et al. |
| 2015/0226205 | A1 | 8/2015 | Hines et al. |
| 2015/0226206 | A1 | 8/2015 | Hines et al. |

FOREIGN PATENT DOCUMENTS

| | | | |
|---|---|---|---|
| EP | 0312862 | A2 | 4/1989 |
| JP | H01148356 | A | 6/1989 |
| JP | 2004261720 | A | 9/2004 |
| JP | 2008246404 | A | 10/2008 |
| JP | 2012506316 | A | 3/2012 |
| WO | 2011094246 | A | 8/2011 |

* cited by examiner

AIRLESS HANDHELD SPRAYER REPAIR

CROSS-REFERENCE TO RELATED APPLICATION

This is a divisional application of U.S. application Ser. No. 15/872,759, filed Jan. 16, 2018, which in turn claims the benefit of priority of U.S. Provisional Application No. 62/446,489, filed Jan. 15, 2017, both of which are hereby incorporated by reference herein in its entirety.

FIELD OF THE INVENTION

This invention concerns sprayers for airless spraying of coatings such as paints and stains.

BACKGROUND

Airless sprayers are used to apply paint to surfaces such as walls and ceilings. A piston pump pulls the paint from a reservoir, such as a bucket, and outputs the paint through a hose under pressure. The pressure on the paint in the hose, downstream from the pump, can be 1,000-5,000 pounds per square inch. Paint under such pressure can atomize into a desired spray pattern when released through a small metal orifice for spaying the paint onto a surface. Such a process is referred to as airless painting because pressurized air is not used to atomize or otherwise propel the air. The paint is directed in the spray pattern by a gun which carries the small metal orifice as a nozzle. The gun is held by a hand of the operator to direct the spray pattern along the surface being painted. Conventionally, the pump unit remains stationary on the ground proximate the reservoir and moves paint down a hose which extends to a separate gun. However, portability is limited and the range of the painter is limited to the hose length as the paint unit is heavy and kept on the ground proximate the reservoir. An advantage of a conventional pump unit is easy field servicing and repair.

A handheld airless paint sprayer, as shown herein, is more portable than a conventional pump unit and is not limited by hose length. However, there remains a desire to have the handheld airless paint sprayer still be easily field serviceable and repairable.

SUMMARY

Various embodiments concern a handheld paint sprayer for spraying a paint. The sprayer can comprise a shell body comprising a door that, when opened, exposes an opening into an interior of the shell body, the door configured to close over the opening. The sprayer can further comprise a trigger connected to a handle, a motor in the interior, and a paint reservoir connected to the shell body. The sprayer can further comprise a nozzle in fluid communication with the reservoir and a pump located in the interior of the shell body. The pump is operated by the motor, the pump configured to pump the paint from the reservoir out of the nozzle as a spray. The pump is removable from the interior of the shell body through the opening when the door is opened but is not removable through the opening when the door is closed.

Various embodiments concern a handheld paint sprayer for spraying a paint, the sprayer comprising: a shell body comprising a first side shell, a second side shell, and a door, the first side shell defining either a left side or a right side of the shell body, and the second side shell defining the other of the left side or the right side of the shell body, wherein the first side shell and the second side shell are fastened to each other to form an interior of the shell body, and wherein the door is removable to expose an opening into the interior. Such embodiments can further include a handle formed at least in part by the first side shell and the second side shell, a trigger connected to the handle, a motor in the interior of the shell body, and a reservoir connected to the shell body, the reservoir configured to hold the paint. Such embodiments can further include a nozzle in fluid communication with the reservoir and a pump located in the interior of the shell body, the pump operated by the motor, the pump configured to pump the paint from the reservoir out of the nozzle as a spray. Such embodiments can further include a drive mechanism located in the interior, the drive mechanism configured to convert rotational motion output by the motor into reciprocal motion that drives the pump. In such embodiments, the pump is removable from the interior of the shell body through the opening when the door is opened, and the pump is not removable from the interior through the opening when the door is closed and the first side shell is fastened to the second side shell.

Various embodiments are directed to a method of servicing a handheld paint sprayer, the method comprising opening a door of a shell body of the handheld paint sprayer, the opening of the door exposing an opening into an interior of the shell body, the shell body formed by a left side shell and a right side shell, the left side shell and the right side shell forming a handle of the paint sprayer. Such method can further includes removing a pump from the interior of the shell body through the opening while the left side shell and the right side shell remain fastened together. Such method can further include replacing the pump with the same or different pump in the interior of the shell body through the opening while the left side shell and the right side shell are fastened together.

The scope of this disclosure is not limited to this summary. Further inventive aspects are presented in the drawings and elsewhere in this specification and in the claims.

This disclosure makes use of multiple embodiments and examples to demonstrate various inventive aspects. The presentation of the featured embodiments and examples should be understood as demonstrating a number of open-ended combinable options and not restricted embodiments.

Changes can be made in form and detail to the various embodiments and features without departing from the spirit and scope of the invention.

DETAILED DESCRIPTION

Various embodiments of the present disclosure can be used to spray paint and/or other solutions. While paint will be used herein as an exemplar, it will be understood that this is merely one example and that other fluids (e.g., water, oil, stains, finishes, coatings, solvents, etc.) can be sprayed instead of paint.

Figure 1:
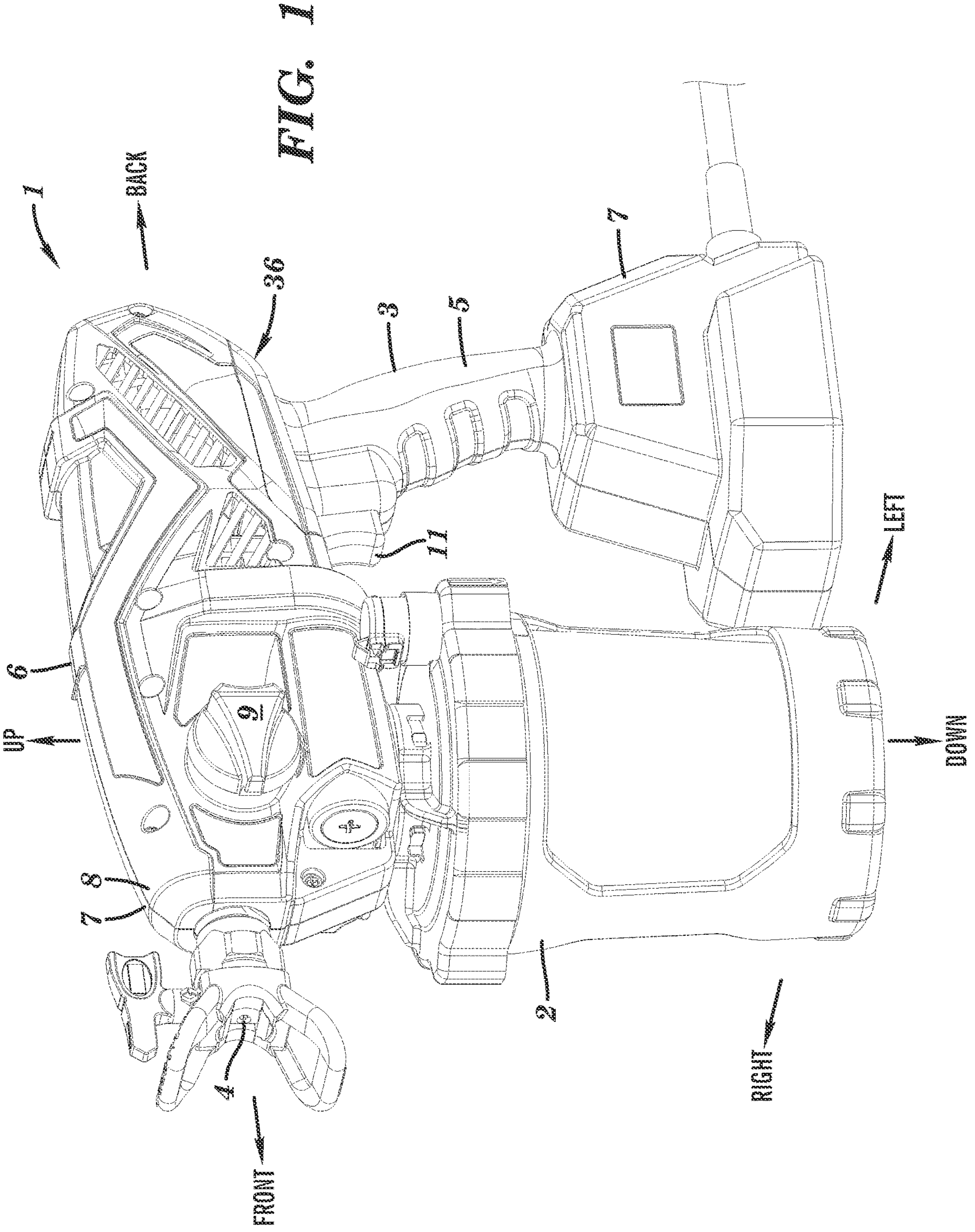
FIG. 1 is a perspective view a handheld sprayer.
Figure 2:
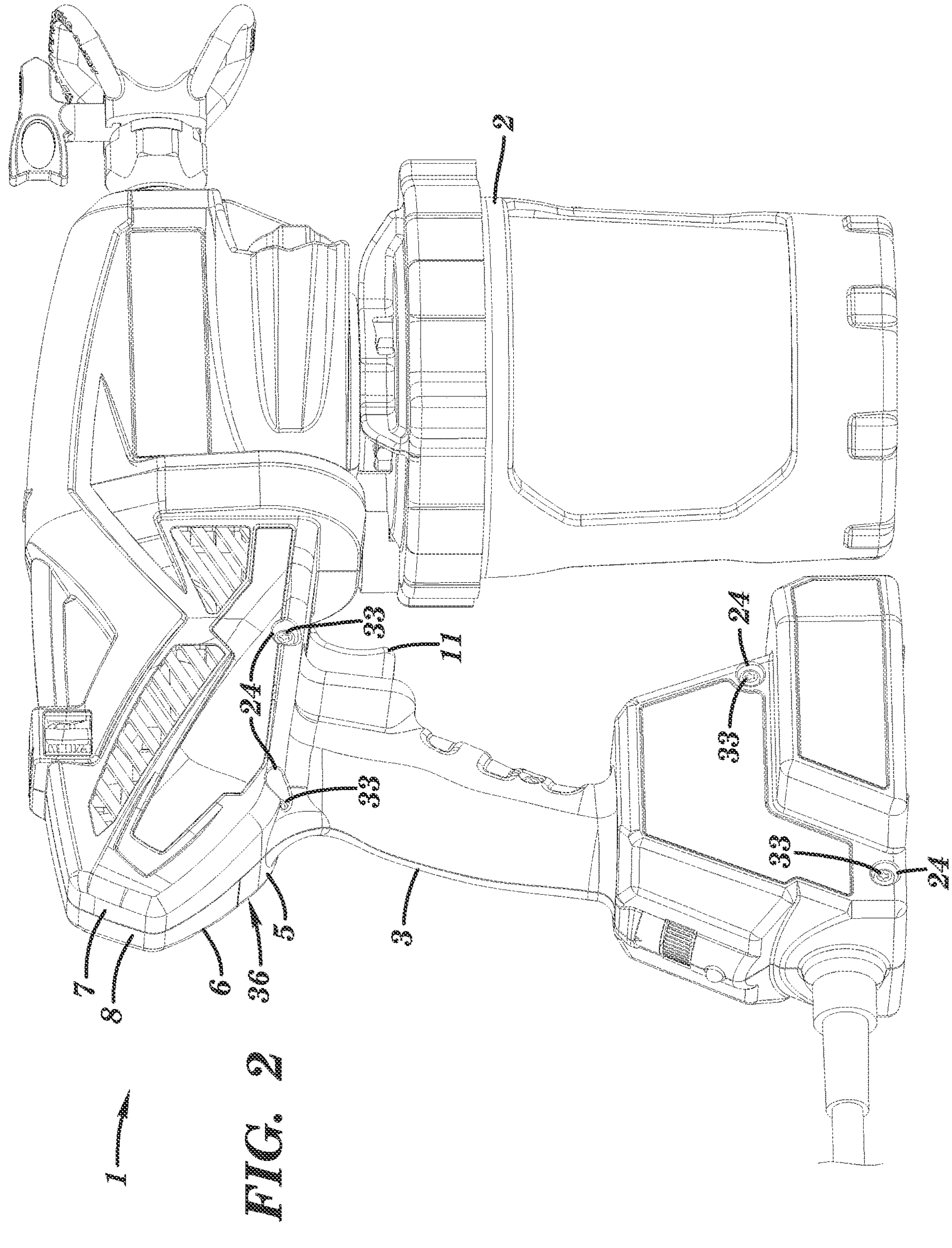
FIG. 2 is a perspective view of the handheld sprayer from the opposite side of the handheld sprayer as compared with FIG. 1.

FIG. 1 is a perspective view mainly showing the left side of a sprayer 1. Relative directions of left, right, up, down, front, and back are indicated in FIG. 1. FIG. 2 is a perspective view of the sprayer 1 mainly showing a right side of the sprayer 1. The sprayer 1 can be operated to spray paint. The sprayer 1 is a handheld sprayer than can be supported and operated by just one hand for spraying. Specifically, an operator can hold the sprayer 1 upright, pointed at a wall, and pull the trigger 1 with one hand. It will be understood that this is but one type of sprayer within which the features of the present disclosure could be embodied. The sprayer 1 includes a reservoir 2. The reservoir 2 can be used to hold the paint to be sprayed, such as by holding the paint in a flexible polymer container. The paint is sprayed out of the nozzle 4. Depressing the trigger 11 causes the sprayer 1 to spray the paint drawn from the reservoir 2. The mechanism for pumping the paint from the reservoir 2 and out the nozzle 4 is contained with the sprayer 1.

The main exterior of the sprayer 1 is formed by a shell body 36. The shell body 36 is a polymer molded clamshell. A polymer molded clamshell is an inexpensive way to form a lightweight support structure having complex geometric features. The parts of the polymer molded clamshell can be formed by injection molding. The polymer may be any structural polymer, such as acrylonitrile butadiene styrene, polycarbonate, polyamide, amongst other options.

The shell body 36 forms a handle 3 and an upper body portion 6. The shell body 36 splits into left and right hemispheres along the visible seam along both of the upper body portion 6 and the handle 3. The handle 3 is shaped to be grasped and held by one hand for supporting the sprayer 1. The handle 3 is elongated and generally orientated up and down. The upper body portion 6 is located above the handle 3 and is elongated front-to-back, generally orthogonal to the main body 6.

The shell body 36 includes a first shell side 5 and a second shell side 7. The first shell side 5 and the second shell side 7 fit together as a clamshell in which the first shell side 5 and the second shell side 7 have complementary edges that align to form an inner space. The second shell side 7 forms most of the right side of the sprayer 1, including the handle 3 and upper body portion 6. The shell body 36 further includes a door 8. The door 8 is on the same side of the sprayer 1 as the first shell side 5 (the left side in this embodiment). The first shell side 5 and the door 8 form most of the left side of the sprayer 1, including the handle 3 and upper body portion 6. However, unlike the second shell side 7 which forms all of one side (the right side in this embodiment) of the handle 3 and the upper body portion 6, the first shell side 5 forms all of the handle 3 but only part of the upper body portion 6 of the side (left side in this embodiment), the door 8 forming the other portion of the side of the upper body portion 6. The door 8 is removable, as further discussed herein.

Holes 30 are exposed on the right side of the sprayer 1. Holes 30 extend through the second side shell 7. The holes 30 align with complementary threaded holes (not shown) on the inside of the first side shell 5. Fasteners 33 extend into the holes 30. More specifically, the fasteners 33 engage with the second side shell 7 inside the holes 30 and further screw into the complementary threaded holes (not shown) on the inside of the first side shell 5. The fasteners 33 thereby secure and hold the first side shell 5 to the second side shell 7.

The sprayer 1 further includes a power source, which can be, as shown, a power cord which connects to a conventional electrical wall outlet. Various other sprayer embodiments can have a battery connected to the sprayer instead of the power cord.

Figure 3:
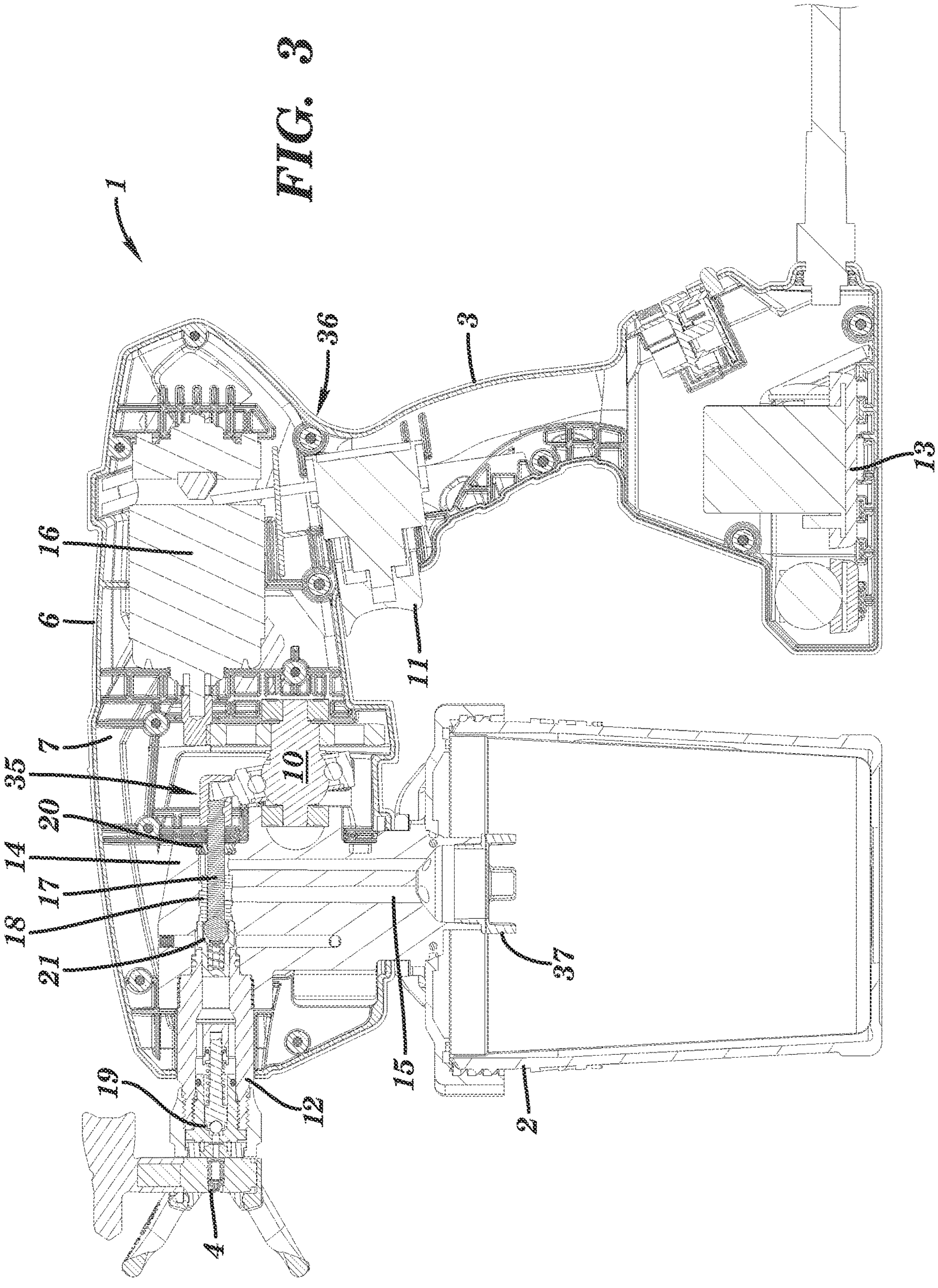
FIG. 3 is a cross-sectional view of the handheld sprayer.

FIG. 3 shows a cross sectional view of the sprayer 1 along the clamshell seam. FIG. 3 shows reservoir connector 37 on which the reservoir 2 is mounted to the rest of the spray 1. For example, the reservoir connector 37 can facilitate connecting the reservoir 2 to the shell body 36, the shell body 36 containing components for moving the paint contained within the reservoir 2.

As shown, a motor 16 is contained within the upper body portion 6. The motor 16 can be, for example, a high voltage electric motor (brushed or brushless). The motor 16 outputs rotational motion via a pinion which interfaces with a gear of drive 10. Rotational output from the motor 16 operates the drive 10 which converts the rotational motion into linear reciprocal motion. A wobble drive 10 is shown to convert rotational motion into linear reciprocal motion, although alternative mechanisms can instead be used, such as various yokes and/or cranks.

The reciprocal motion is used to operate the pump 14. The pump 14 includes a housing within which piston 17 reciprocates. While only one piston is shown in the view of FIG. 3, two other pistons (and all associated components) are located within the pump 14 and operate similarly, however different embodiments may only have two pistons or a single piston, or a different type of pump (e.g., a non-piston pump). The piston 17 is located at least partially within a cylinder 18 of the pump 14. The piston 17 and the cylinder 18 can be formed from carbide, amongst other options. The pump 14 includes an outer pump body which encases the cylinder 18 and surrounds the front end of the piston 17. The pump body can be formed from polymer or metal. A seal 20 is located between each piston 17 and the pump 14 body, the seal 20 surrounding the piston 17. The seal 20 can help prevent leakage of paint from the pump 14.

The reciprocating motion of the piston 17 pulls paint from within the reservoir 2 through the intake channel 15 and then into a chamber formed by the cylinder 18 and the piston 17 on an upstroke or back stroke and then expels the paint under pressure from the chamber on the downstroke or forward stroke. Upon being expelled from the chamber, the paint passes through valve 21, which is located within the pump 14. The fluid output pathways from the three piston/cylinder combinations combine within the pump 14 into a single pathway that flows into the valve body 12. The paint passes through valve 19 which is located within the valve body 12. Under pressure from the pump 14, the paint flows to the nozzle 4 for release as an atomized spray fan. In operation, activation of the trigger 11 starts the motor 16 which causes the pump 14 to pump and generate enough fluid pressure within the valve body 12 to open the valve 19 and be released as an atomized spray fan. Deactivation of the trigger 11 stops the motor 16 which causes the pump 14 to stop and the pressure within the valve body 12 to drop, closing the valve 19 and stopping the output of paint.

The sprayer 1 includes control circuitry 13. Control circuitry 13 can be entirely or partially mounted on a board. The control circuitry 13 can control operation of the sprayer 1. In particular, the control circuitry 13 can receive input from the trigger 8, a spray setting input (e.g., a potentiometer dial of the input dial 9 for a user to select a pressure output level and/or operate a priming setting), and the power source and, using these inputs, controls power to the motor 16 to control spraying.

The pump 14 includes components that may wear or clog, such as the piston 17, the cylinder 18, seal 20, and valve 21. Therefore, some designs of the pump 14 may occasionally need servicing or replacement. However, the pump 14 is located at least partially within the polymer molded clamshell body of the sprayer 1 and thus could be hard to access. The present disclosure includes pump 14 access and removal features, as further discussed herein, such that the sprayer 1 has the convenience and portability of a handheld device (due to its enclosed polymer molded clamshell housing) with the serviceability typically associated with much larger ground mounted units. FIGS. 4-10 further demonstrate how to access the pump 14 and other internal components for servicing.

Figure 4:
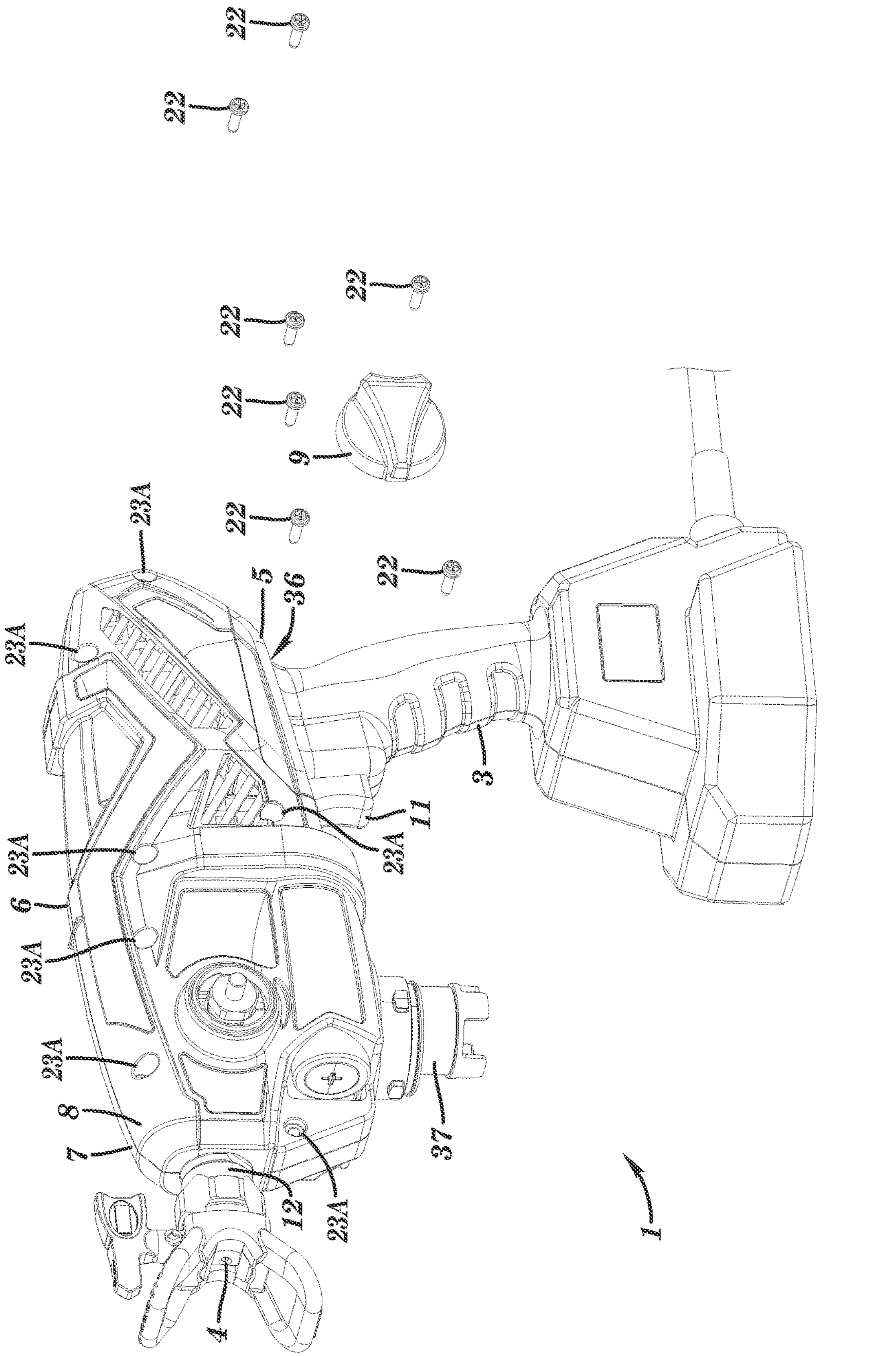
FIG. 4 is a perspective view of the handheld sprayer showing fastener removal.

FIG. 4 shows a perspective view of the sprayer 1. The reservoir 2 has been removed from the sprayer 1. Specifically, the reservoir 2 connects to the bottom of the pump 14 by a bayonet connection of the reservoir connector 37 in this embodiment. As such, the reservoir 2 can be rotated and pulled away for removal.

FIG. 4 shows holes 23A are exposed on the left side of the shell body 36. The holes 23A are formed in the upper body portion 6. The holes 23A extend through the door 8. FIG. 4 shows that fasteners 22 have been screwed out of holes 23A. The fasteners 22 normally reside in the holes 23A and threadedly engage holes (holes 23B in FIG. 5) in the second shell side 7 which align with the holes 23A when the door 8 is in place on the sprayer 1. The fasteners 22 are screws, although other types of fasteners could instead be used. The fasteners 22 can be screwed in and out using a screw driver, such as a cross-recess (Phillips) head. The input dial 9 has also been removed in FIG. 4, which can pull off, optionally with the removal of a screw that extends through the input dial 9. The fasteners 22 fix the door 8 to the second shell side 7, so removal of the fasteners 22 from the holes 23B of the second shell side 7 unsecures the door 8 from the second shell side 7 to allow the door 8 to be opened.

Figure 5:
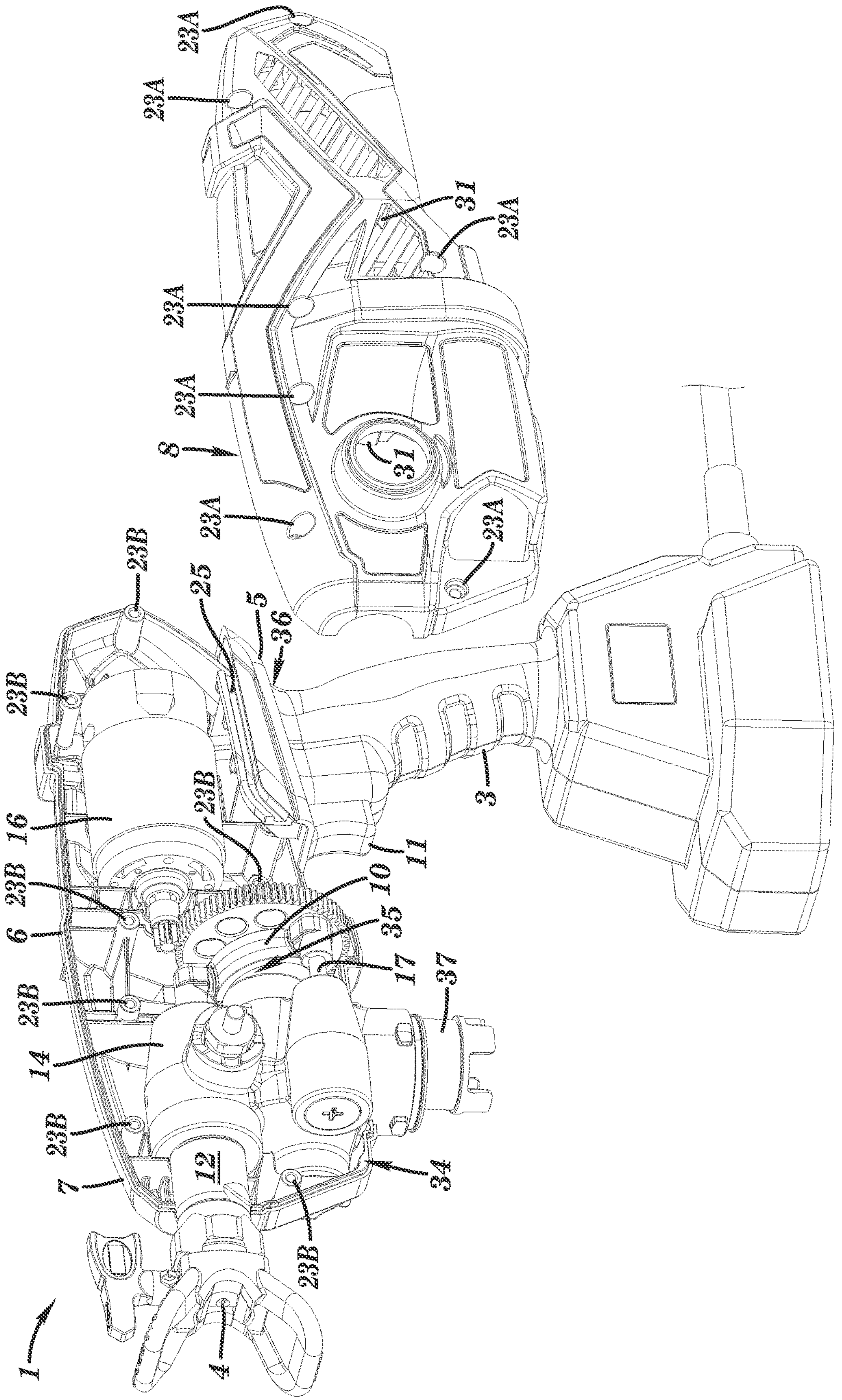
FIG. 5 is a perspective view of the handheld sprayer showing door removal.

FIG. 5 is a perspective view of the sprayer 1 after the door 8 has been removed from the rest of the sprayer 1. Door 8 lifts away from the second shell side 7 after the removal of the fasteners 22. The removal of the door 8 exposes the components of the sprayer 1 located within the upper body portion 6. The removal of the door 8 exposes the threaded portions of the holes 23A formed in the second shell side 7. The holes 23A in the door 8 align with the holes 23B in the second shell side 7 such that fasteners 22 extending through the holes 23A-B secures the door 8 in a closed position.

Removal of the door 8 creates an opening 34 in the shell body 36. The opening 34 allows access into an interior 35 of shell body 36. The opening 34 can have the same profile as the door 8 itself. The interior 35 is the space within the shell body 36. The interior 35 can include the enclosed space between the first shell side 5 and the second shell side 7. The interior 35 can contain the pump 14, the drive 10, and the motor 16. Specifically, the pump 14, the drive 10, and the motor 16 are contained within the interior 35 of the upper body portion 6.

Figure 6:
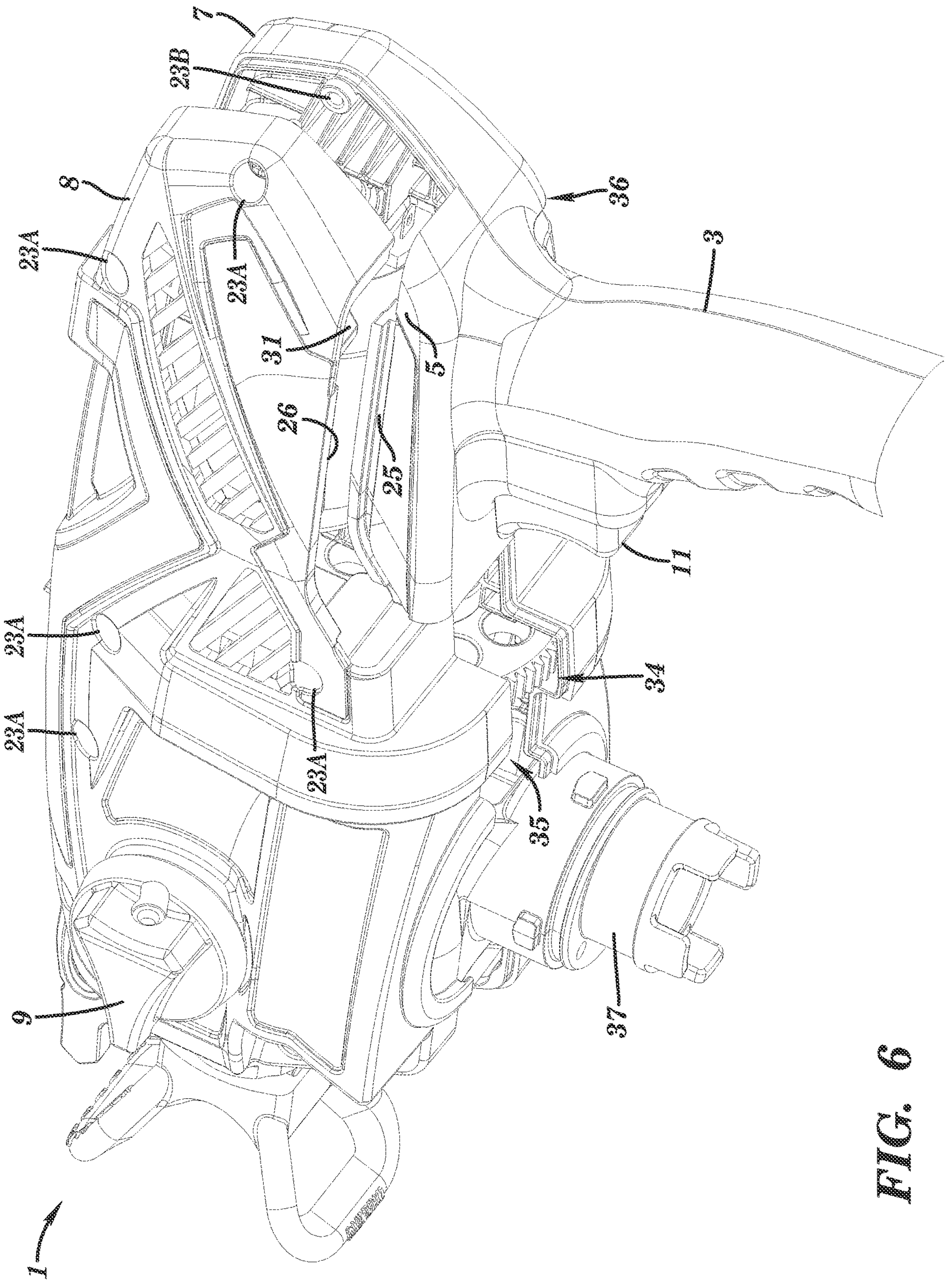
FIG. 6 is a detailed view from another perspective showing door removal from the handheld sprayer.

FIG. 6 is a detailed view showing the door 8 being lifted away from the second shell side 7. In particular, the view shows the interfacing of a tongue 26 and groove 25 formed between the first shell side 5 and the door 8. A portion of the door 8 overlaps and engages the first shell side 5 when the door 8 is placed on the sprayer 1 to align and fit with the second shell side 7. Along this overlap, a tongue 26 of the door 8 fits within the groove 25 formed in the first shell side 5. This tongue 26 and groove 25 interfacing helps align the door 8 with the second shell side 7 and further helps fix the position of the door 8 to the second shell side 7 before the fasteners 22 are threaded into the holes 23A-B.

Figure 7:
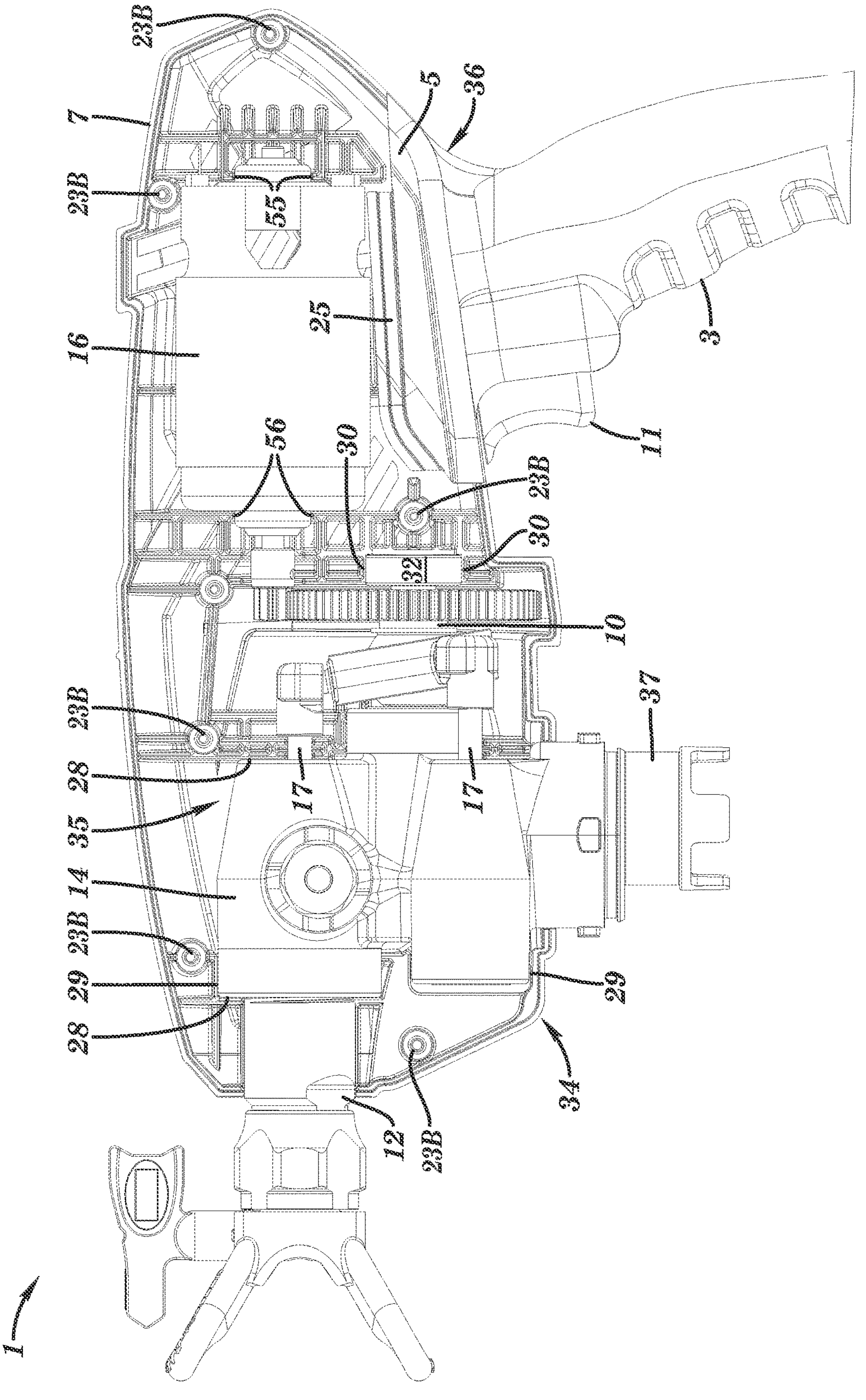
FIG. 7 is a side view of the handheld sprayer after door removal.

FIG. 7 shows a detailed side view of the sprayer 1 after removal of the door 8. In particular, FIG. 7 shows how ribs 28, 29, 30, 56 of the second shell side 7 engage and support the pump 14, bearing 32, and motor 16. The ribs 28, 29, 30, 55, 56 are part of the polymer molding of the second shell side 7 and project into the interior 35 of the upper body portion 6. Ribs 28 are located on, and contact, front and back sides of the pump 14 to prevent the pump 14 from moving forwards or backwards within the interior 35. Ribs 29 are located on, and contact, top and bottom sides of the pump 14 to prevent the pump 14 from moving up and down within the interior 35. The pump 14 can be press fit between the ribs 28, 29 to secure the pump 14. Rotating bearing 32, which is connected to the drive 10, is located between and engages ribs 30 which secures the rotating bearing 32 as well as the drive 10 and pump 14 connected thereto. Motor 26 is located between and engages ribs 55, 56 which secures the motor 56 within the interior 35 of the shell body 36.

The door 8 includes ribs 31 which are symmetrical and mirror the ribs 28, 29, 30, 55 and/or 56 of the second shell side 7. The ribs 31 hold and support the pump 14, drive 10, bearing 32, and motor 16 in the same manner as ribs 28, 29, 30, 55 and/or 56. The ribs 31 of the door 8 are molded from the same polymer material as the rest of the door 8 and project inward. The ribs 28, 29, 30, 31, 55, 56 of the second shell side 7 and the door 8 pinch the pump 14, bearing 32, and/or motor 16 to secure these components within the interior 35 of the upper body portion 6 when the door 8 is secured to the second shell side 7. The ribs 28, 29, 30, 31, 55, 56 can provide annular or semi-annular contact with the pump 14, bearing 32, and/or motor 16, particularly around circular portions of the pump 14, bearing 32, and/or motor 16. As such, the ribs 28, 29, 30, 31 of the second shell side 7 and the door 8 can each form half circle inward projections, the two half circles aligning in left and right sides to form inward annular projections which annularly engage and secure the pump 14, bearing 32, and/or motor 16. When the door 8 is secured to the second shell side 7, then the ribs 28, 29, 30, 31, 55, 56 hold the pump 14, bearing 32, and/or motor 16 in fixed positions, but removal of the door 8 removes, for example, the ribs 31. Removal of ribs 31 can remove half of the inward annular projections which partially unsecures the pump 14, drive 10, and/or motor 16 and allows these parts to be unsecured and slide out, as further shown herein.

Figure 8:
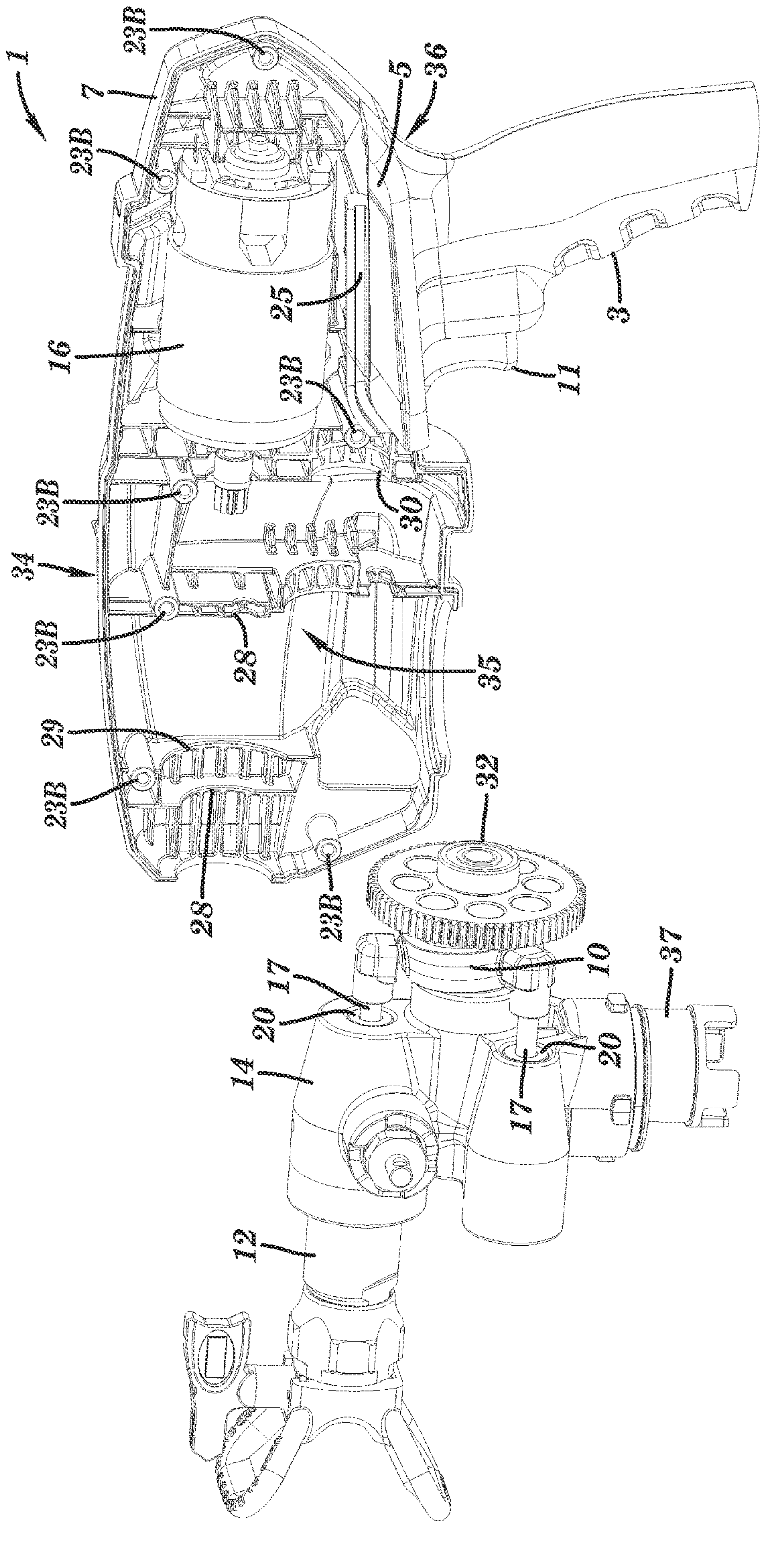
FIG. 8 is a perspective view of the handheld sprayer showing pump and drive removal.

FIG. 8 is a perspective view showing the valve body 12, pump 14, drive 10, and bearing 32 having been removed through the opening 34 from the interior 35 of the shell body 36. As shown, the valve body 12, pump 14, drive 10, and bearing 32 are removed together as one interconnected piece. The valve body 12, pump 14, drive 10, and bearing 32 can slide out from the ribs of the second shell side 7 being that the door 8 has been removed which would otherwise have blocked this sliding motion.

Figure 9:
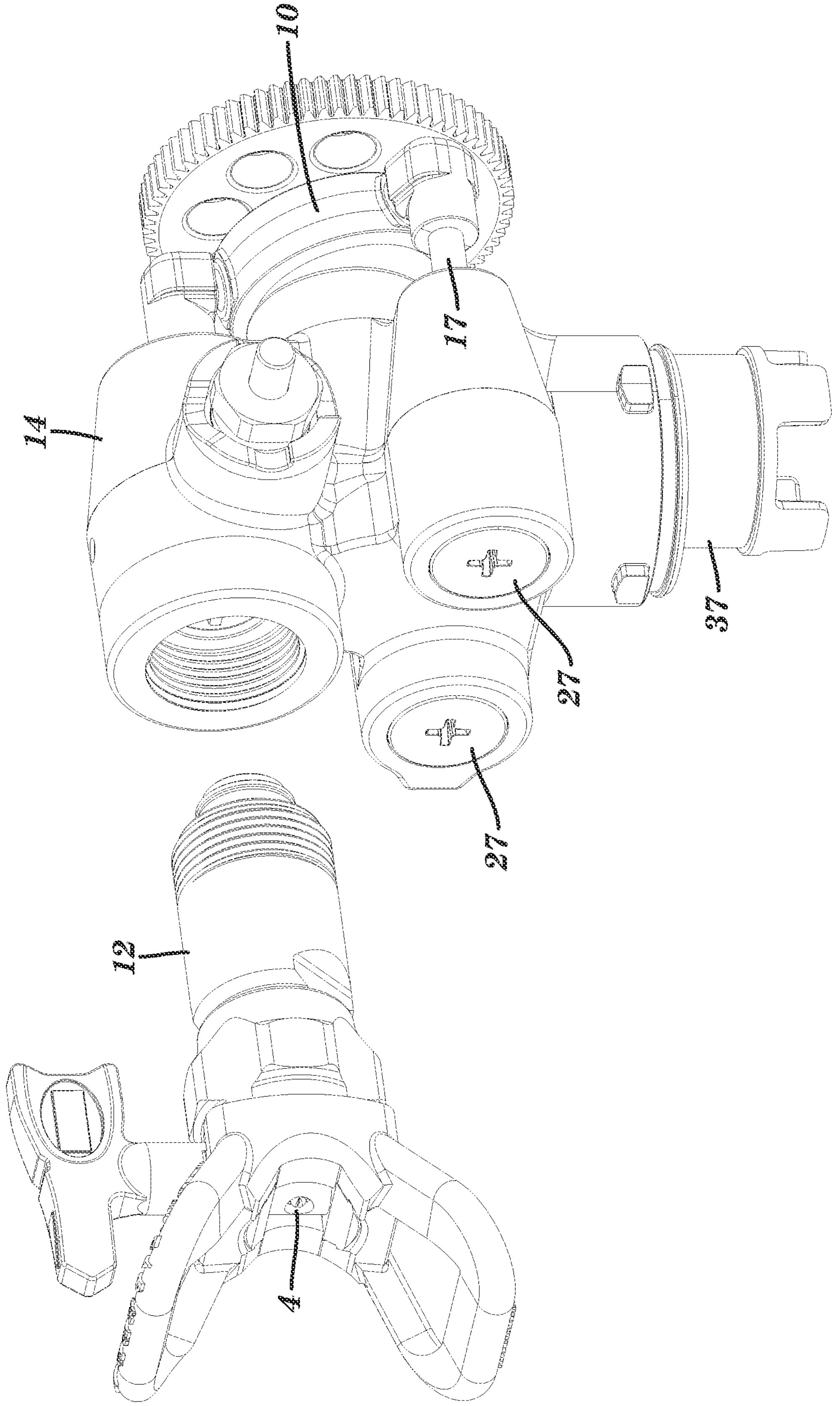
FIG. 9 is a perspective view showing nozzle and valve body removal from the pump.

FIG. 9 shows that the valve body 12 can be disconnected from the pump 14 by unthreading the valve body 12 from the pump 14. This step alternatively can be performed while the pump 14 is still located within the upper body portion 6 and the door 8 is secured to the second shell side 7. Specifically, the valve body 12 can be unthreaded from the pump 14 and slide forward, out of the upper body portion 6.

The view of FIG. 9 shows three cylindrical sections each of which includes a piston, a cylinder, and a valve (same as the piston 17, the cylinder 18, and the valve 21). Removal of the valve body 12 allow access to inside the pump 14, such as to clean the chamber and/or valve 21 of the top-middle piston. Plugs 27 can be unscrewed from the pump 14 to access inside the pump 14 in identical manner to the valve body 12 being removed (plugs 27 are threaded into holes in the pump 14 just like, and to the same depth, as the valve body 12). Removal of the plugs 27 allows cleaning of the other two chambers and/or valves 29 of the lower left and right pistons, just like with removal of the valve body 12. The valve body 12 and the plugs 27 can be removed to service the pump without removing the door 8 or removing the pump 14 from the upper body portion 6. As explained previously, the valve body 12 can be unscrewed and slide out of the upper body portion 6 and the plugs 27 are normally exposed (see FIGS. 1 and 4) through three respective voids in the clamshell.

Figure 10:
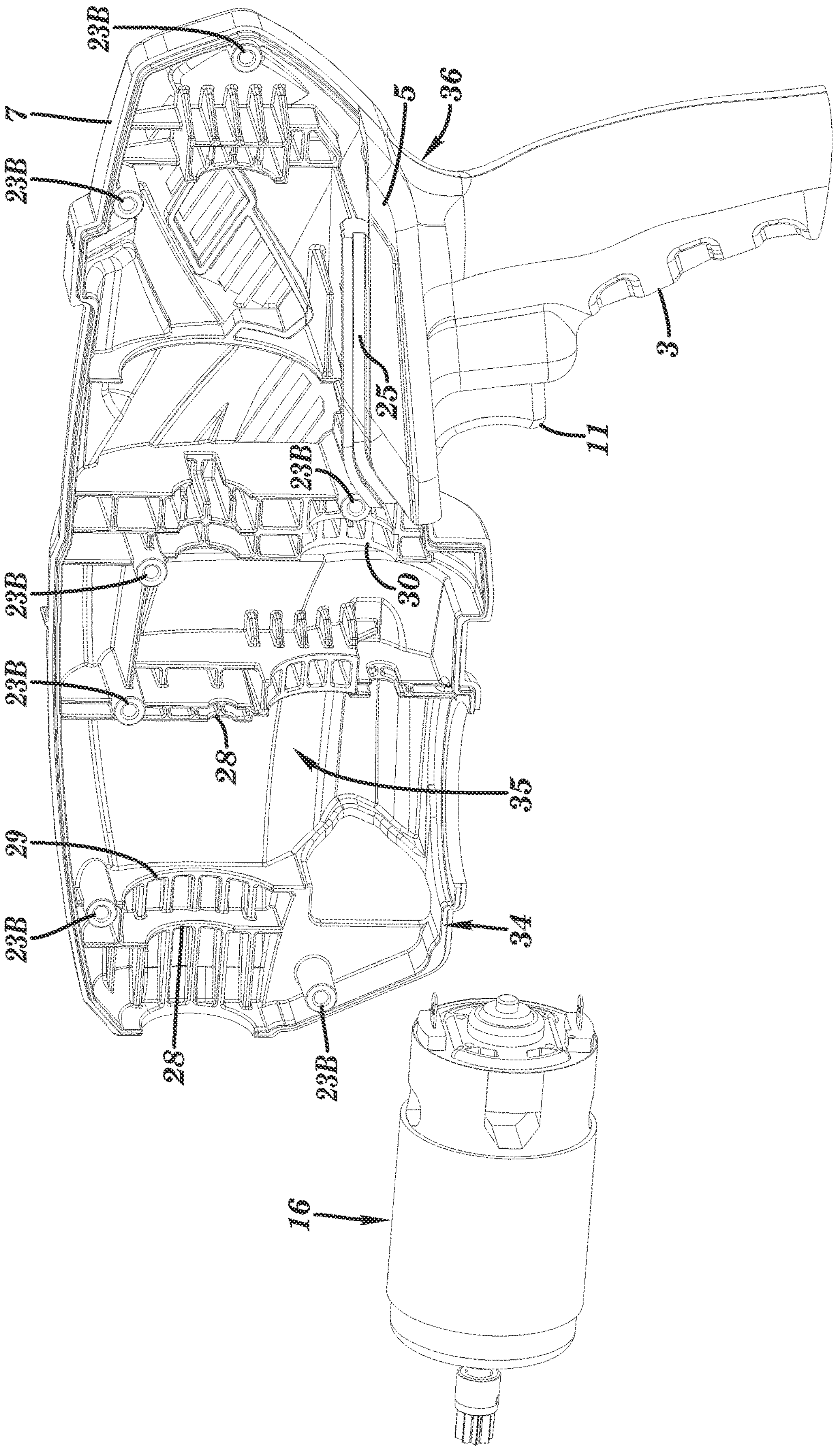
FIG. 10 is a perspective view of the handheld sprayer showing motor removal.

FIG. 10 is an isometric view showing the motor 16 having been removed from the interior 35 of the upper portion 6 of the sprayer 1. The motor 16 can slide out from the ribs 55, 56 of the second shell side 7 being that the door 8 has been removed which would otherwise have blocked this sliding motion. While the sequence of Figs. shows the pump 14 being removed before the motor 16, removal can occur in the reverse order or simultaneously. Also, either of the motor 16 or pump 14 can be removed from the upper portion 6 while the other remains.

Figure 11:
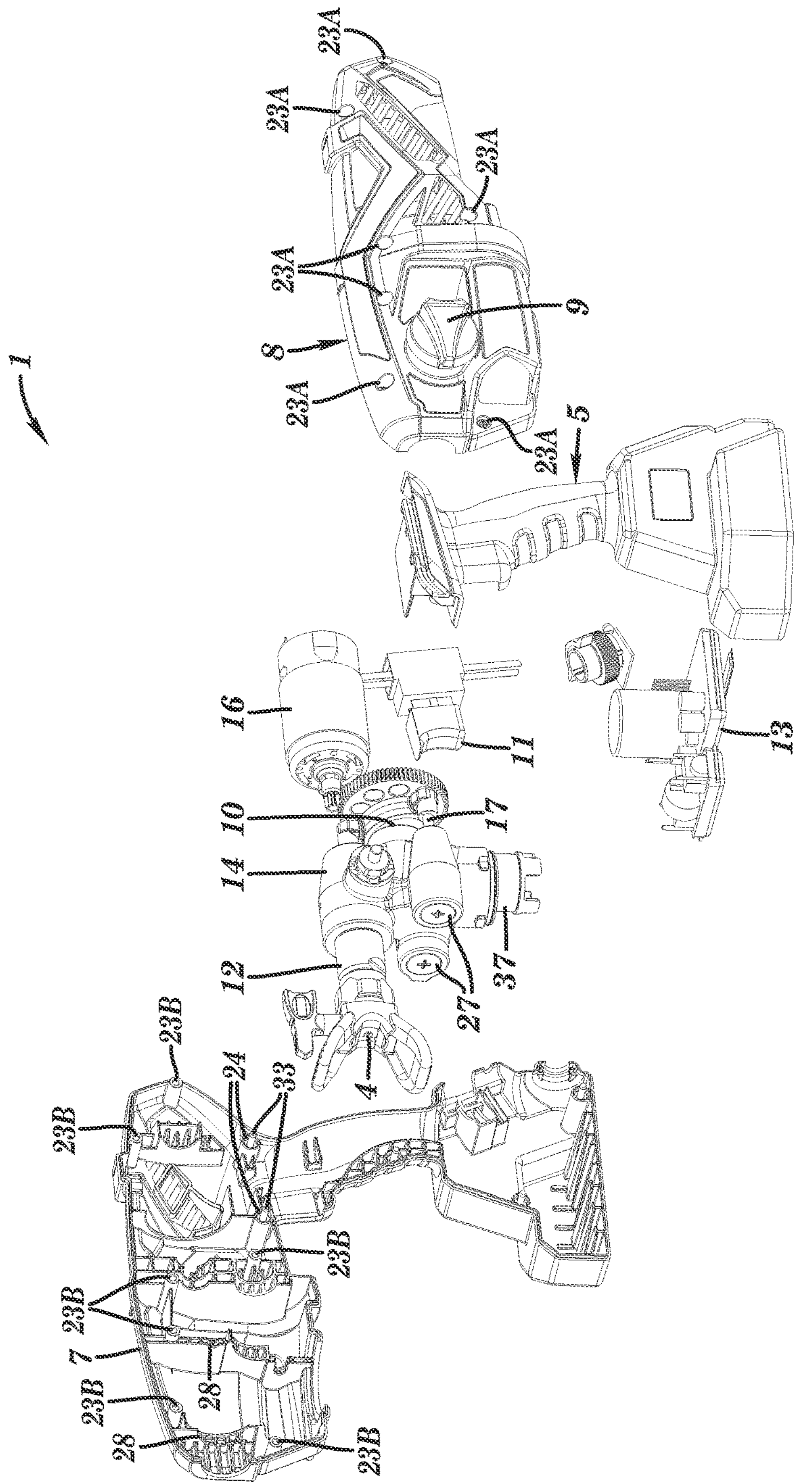
FIG. 11 is an exploded view of the handheld sprayer.

FIG. 11 is an exploded view showing the parts of the clamshell with the internal parts of the sprayer 1 located directly between. FIG. 11 demonstrates, among other things, how the second shell side 7, the first shell side 5, and the door 8 align and come together to form the clamshell around the mechanical and electrical components of the sprayer 1. Complete disassembly allows all of the parts to fall away from the clamshell housing, making it difficult to put the parts back together. The door 8 of the sprayer 1 allows those parts most in need of servicing to be accessed with a minimal amount of disassembly, thus allowing the sprayer 1 to remain intact to a large degree during servicing. It would not be intended that the user would disassemble the sprayer 1 to the extent shown in FIG. 11. Rather, the only maintenance that may be needed during the life of the sprayer 1 can be performed by removal of the door 8 as explained. Specifically, removal of the door 8 provides access to the moving and mechanical components while the further disassembly of the handle 3, by unsecuring the first shell side 5 from the second shell side 7, only exposes non-moving electrical components such as the control circuitry 13 which are only rarely in need of servicing. Several features are provided to ease removal of the door 8 while discouraging separation of the first shell side 5 from the second shell side 7, as further discussed herein.

The first shell side 5 is attached to the second shell side 7 by fasteners 33 that are similar to fasteners 22, but with some advantageous differences. The fasteners 33 that secure the first shell side 5 to the second shell side 7 extend into the holes 24 shown in FIG. 2 on the right side of the sprayer 1. The holes 24 align with threaded inner holes in the first shell side 5 so that the fasteners 33 can thread into the threaded inner holes in the first shell side 5 to secure the second shell side 7 to the first shell side 5. The fasteners 33 that go into the holes 24 on the right side do not secure or otherwise contact the door 8. Rather, all of the fasteners 22 and corresponding holes 23A that secure and/or contact the door 8 can only be inserted/removed from one side (e.g., the left side) of the sprayer 1 while the fasteners 33 that secure the second shell side 7 to the first shell side 5 can only be inserted/removed from the other side (e.g., right side) of the sprayer 1. This difference serves as an easy convention for understanding which fasteners to remove for servicing of the sprayer 1 and as deterrent for not removing screws that do not assist with servicing. Furthermore, the fasteners 22 that secure the door 8 to the second shell side 7 can be of a first type configured to be turned by a first type of tool (e.g., a conventional screwing tool, such as a straight (i.e. regular) or cross (Phillips-head) screwdriver). The fasteners 33 that secure the second shell side 7 to the first shell side 5 can be of a second type configured to be turned by a second type of tool (e.g., an unconventional screwing tool, such as a torx (star) head screwdriver), the second type different from the first type. The commonality of the first type of tool will encourage removal of these fasteners 22 while the relatively rarity of the second type of tool will discourage removal of the screws that secure the second shell side 7 to the first shell side 5.

The present disclosure is made using an embodiment to highlight various inventive aspects. Modifications can be made to the embodiment presented herein without departing from the scope of the invention. As such, the scope of the invention is not limited to the embodiment disclosed herein.

The following is claimed:

1. An integrated pump and drive assembly that can be installed in a handheld fluid sprayer having an opening, the integrated pump and drive assembly comprising: a rotating bearing;

a gear;

a drive configured to convert rotational motion from the gear into linear reciprocating motion; and a pump, the pump comprising an outer pump body and three pistons located respectively within three cylinders located respectively within three exterior cylindrical sections formed by the outer pump body, the outer pump body formed from polymer, each of the pistons configured to reciprocate respectively within the cylinders by the drive to pump fluid, the pump further comprising three valves located respectively within the three exterior cylindrical sections and respectively downstream from the three pistons;

wherein the bearing is located rearward of the gear and the drive, wherein the pump is located forward of the gear and the drive such that the gear and the drive are both located directly between the pump and the bearing, wherein the gear, the drive, the pump, and the rotating bearing are joined together as a single interconnected piece independently of the handheld fluid sprayer such that the single interconnected piece can be installed and removed from the opening of the handheld fluid sprayer through the opening.

2. The integrated pump and drive assembly of claim 1, wherein the outer pump body defines an intake channel that routes fluid to the three cylinders.

3. The integrated pump and drive assembly of claim 1, further comprising a three seals respectively mounted on the three pistons.

4. The integrated pump and drive assembly of claim 3, wherein each seal is located between the piston on which it is respectively mounted and the pump body.

5. The integrated pump and drive assembly of claim 1, wherein the gear comprises exposed teeth.

6. The integrated pump and drive assembly of claim 1, wherein the gear is configured to interface with a pinion of the handheld fluid sprayer.

7. The integrated pump and drive assembly of claim 1, wherein the rotating bearing is configured to secure the integrated pump and drive assembly when installed within the handheld fluid sprayer.

8. The integrated pump and drive assembly of claim 1, wherein each piston of the three pistons connects with the drive such that the piston extends from the drive to the outer pump body.

9. The integrated pump and drive assembly of claim 8, wherein at least part of each piston is exposed between the drive and the pump.

10. The integrated pump and drive assembly of claim 1, wherein the pump body defines a reservoir connector.

11. The integrated pump and drive assembly of claim 10, wherein the reservoir connector is configured to connect to a fluid reservoir such that the reservoir connector supports the fluid reservoir.

12. An integrated pump and drive assembly comprising:

a rotating bearing;

a gear;

a drive configured to convert rotational motion from the gear into linear reciprocating motion; and a pump, the pump comprising an outer pump body, the outer pump body having three exterior cylindrical sections, the pump further comprising three pistons located respectively within three cylinders located respectively within the three exterior cylindrical sections of the outer pump body, the outer pump body formed from polymer, the three pistons configured to reciprocate respectively within the three cylinders by the drive to pump fluid, the pump further comprising three valves respectively located within the three exterior cylindrical sections and respectively downstream from the three pistons;

wherein the bearing is located rearward of the gear and the drive, wherein the pump is located forward of the gear and the drive such that the gear and the drive are both located directly between the pump and the bearing, and wherein the gear, the drive, the pump, and the rotating bearing are joined together as a single interconnected piece.

* * * * *